United States Patent
Gupta et al.

(10) Patent No.: US 9,753,317 B2
(45) Date of Patent: *Sep. 5, 2017

(54) METHODS FOR TRIMMING POLARIZERS IN DISPLAYS USING EDGE PROTECTION STRUCTURES

(71) Applicant: Apple Inc., Cupertino, CA (US)

(72) Inventors: Nathan K. Gupta, San Francisco, CA (US); Mohd Fadzli A. Hassan, San Francisco, CA (US); Kuan-Ying Lin, Mountain View, CA (US); Yu-Cheng Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 13/915,024

(22) Filed: Jun. 11, 2013

(65) Prior Publication Data

US 2014/0176848 A1 Jun. 26, 2014

Related U.S. Application Data

(60) Provisional application No. 61/745,117, filed on Dec. 21, 2012.

(51) Int. Cl.
G02F 1/1333 (2006.01)
G02F 1/1335 (2006.01)
(Continued)

(52) U.S. Cl.
CPC ...... *G02F 1/133351* (2013.01); *B23K 26/361* (2015.10); *C03B 33/0222* (2013.01);
(Continued)

(58) Field of Classification Search
CPC ........ G02F 2001/133331; G02F 2001/133311; G02F 1/133528; G02F 1/1339;
(Continued)

(56) References Cited

U.S. PATENT DOCUMENTS 5,610,742 A * 3/1997 Hinata .................. G02F 1/1333
349/122
5,776,220 A 7/1998 Allaire et al.
(Continued)

FOREIGN PATENT DOCUMENTS

CN 1942815 4/2007
CN 102177538 9/2011
(Continued)

OTHER PUBLICATIONS

Hassan, U.S. Appl. No. 13/723,130, filed Dec. 20, 2012.
(Continued)

*Primary Examiner* — Jessica M Merlin
(74) *Attorney, Agent, or Firm* — Treyz Law Group, P.C.; Kendall W. Abbasi

(57) ABSTRACT

An electronic device is provided with a display such as a liquid crystal display. The display has a layer of liquid crystal material sandwiched between an upper display layer such as a color filter layer and a lower display layer such as a thin-film-transistor layer. An upper polarizer is formed on the upper surface of the color filter layer. A lower polarizer is formed on the lower surface of the thin-film-transistor layer. To protect display layers such as the color filter layer and the thin-film-transistor layer, a coating is deposited on a peripheral edge of the display layer. A laser is used to cut through portions of the polarizer that overhang the display layer while also cutting through the coating on the peripheral edge of the display layer. Following laser trimming operations, the coating is flush with an edge surface of the polarizer.

23 Claims, 18 Drawing Sheets

(51) Int. Cl.
*B23K 26/361* (2014.01)
*C03B 33/07* (2006.01)
*C03B 33/02* (2006.01)

(52) U.S. Cl.
CPC ............ *C03B 33/07* (2013.01); *C03B 33/074* (2013.01); *C03B 33/076* (2013.01); *B32B 2255/00* (2013.01); *G02F 1/133528* (2013.01)

(58) Field of Classification Search
CPC ............ G02F 1/1341; G02F 1/133351; G02F 2001/13354; B23K 26/361; C03B 33/0222; C03B 33/07; C03B 33/074; C03B 33/076
See application file for complete search history.

(56) References Cited

U.S. PATENT DOCUMENTS

| | | | |
|---|---|---|---|
| 6,028,288 A | 2/2000 | Moriike | |
| 6,066,018 A * | 5/2000 | Grupp | G02F 1/133351 349/190 |
| 6,379,509 B2 | 4/2002 | Choi et al. | |
| 6,407,360 B1 | 6/2002 | Choo et al. | |
| 6,512,196 B1 | 1/2003 | Yoon et al. | |
| 6,628,365 B1 | 9/2003 | Park et al. | |
| 6,689,544 B2 | 2/2004 | Nagarkar et al. | |
| 6,995,916 B2 | 2/2006 | Yamanaka et al. | |
| 7,046,312 B2 | 5/2006 | Koyama et al. | |
| 7,520,654 B2 | 4/2009 | Freking | |
| 7,876,502 B2 | 1/2011 | Ito et al. | |
| 7,907,231 B2 * | 3/2011 | Sato | G02F 1/13452 349/58 |
| 7,976,657 B2 | 7/2011 | Kimura et al. | |
| 8,034,209 B2 | 10/2011 | Danner et al. | |
| 8,235,761 B2 | 8/2012 | Tannas, Jr. | |
| 8,259,250 B2 * | 9/2012 | Sato | G02F 1/13452 349/58 |
| 8,259,263 B2 | 9/2012 | Kimura et al. | |
| 8,325,320 B2 | 12/2012 | Lee et al. | |
| 8,482,713 B2 * | 7/2013 | Qi | B23K 26/38 156/267 |
| 8,610,842 B2 * | 12/2013 | Kim | G03B 17/02 348/333.08 |
| 8,988,636 B2 * | 3/2015 | Hassan | G02F 1/133528 349/102 |
| 9,221,125 B2 * | 12/2015 | Qi | B23K 26/38 |
| 9,282,666 B2 * | 3/2016 | Jang | H05K 7/02 |
| 9,445,518 B2 * | 9/2016 | Yoon | G02F 1/1303 |
| 2004/0085492 A1 * | 5/2004 | Saitoh | 349/65 |
| 2005/0073642 A1 * | 4/2005 | Dunn | G02F 1/133382 349/199 |
| 2005/0238852 A1 | 10/2005 | Nakayama et al. | |
| 2006/0197904 A1 | 9/2006 | Kinoshita et al. | |
| 2007/0188688 A1 | 8/2007 | Hwang et al. | |
| 2007/0211331 A1 | 9/2007 | Danner et al. | |
| 2008/0158475 A1 | 7/2008 | Miyashita et al. | |
| 2009/0130341 A1 | 5/2009 | Asada | |
| 2009/0316062 A1 * | 12/2009 | Nishizawa | 349/58 |
| 2010/0147814 A1 | 6/2010 | Watanabe | |
| 2010/0210055 A1 | 8/2010 | Yoon et al. | |
| 2011/0005662 A1 | 1/2011 | Sung | |
| 2011/0109829 A1 * | 5/2011 | Mathew | G02F 1/133514 349/58 |
| 2011/0199348 A1 * | 8/2011 | Takatani et al. | 345/204 |
| 2012/0020001 A1 | 1/2012 | Mathew et al. | |
| 2012/0099056 A1 | 4/2012 | Lee et al. | |
| 2012/0200812 A1 | 8/2012 | Qi et al. | |
| 2012/0235315 A1 | 9/2012 | Wu et al. | |
| 2013/0236680 A1 * | 9/2013 | Ahn | G02F 1/133308 428/68 |
| 2014/0263211 A1 * | 9/2014 | Hassan | B23K 26/048 219/121.69 |
| 2016/0231619 A1 * | 8/2016 | Hassan | G02F 1/133528 |

FOREIGN PATENT DOCUMENTS

| | | |
|---|---|---|
| CN | 102626833 | 8/2012 |
| EP | 1122584 | 10/2007 |
| WO | 2010044291 | 4/2010 |

OTHER PUBLICATIONS

Gupta et al., U.S. Appl. No. 61/745,117, filed Dec. 21, 2012.
Qi et al., U.S. Appl. No. 13/021,183, filed Feb. 4, 2011.
Hassan, U.S. Appl. No. 13/656,267, filed Oct. 19, 2012.

* cited by examiner

METHODS FOR TRIMMING POLARIZERS IN DISPLAYS USING EDGE PROTECTION STRUCTURES

This application claims priority to U.S. provisional patent application No. 61/745,117 filed Dec. 21, 2012, which is hereby incorporated by reference herein in its entirety.

BACKGROUND

This relates generally to electronic devices and, more particularly, to electronic devices with displays.

Electronic devices often include displays. For example, cellular telephones and portable computers often include displays for presenting information to a user.

Displays such as liquid crystal display have polarizers. The polarizers are formed from polymer layers that are laminated to glass display layers. It may be desirable to ensure that a polarizer layer has the same size as an associated glass display layer. If the polarizer is too large, the edge of the polarizer will overhang the edge of the glass display layer, which in turn can lead to polarizer peeling. If the polarizer is too small, the edge of the display will have an unsightly visible polarizer edge. Although the polarizer edge may be covered with a plastic bezel, the use of a bezel reduces the visible area of a display and can make the display unattractive.

It would therefore be desirable to be able to provide improved displays with polarizers for electronic devices.

SUMMARY

An electronic device is provided with a display such as a liquid crystal display mounted in an electronic device housing. The display has a layer of liquid crystal material sandwiched between an upper display layer such as a color filter layer and a lower display layer such as a thin-film-transistor layer.

An upper polarizer is formed on the upper surface of the color filter layer. A lower polarizer is formed on the lower surface of the thin-film-transistor layer. Additional display structures provide backlight for the display.

To protect display layers such as the color filter layer and the thin-film-transistor layer, a coating is deposited on a peripheral edge of the display layer. A laser is used to cut through portions of the polarizer that overhang the display layer while also cutting through the coating on the peripheral edge of the display layer. Following laser trimming operations, the coating is flush with an edge surface of the polarizer. The coating provides protection to the display layers while also providing support to the edge portions of the polarizer.

Further features, their nature and various advantages will be more apparent from the accompanying drawings and the following detailed description of the preferred embodiments.

DETAILED DESCRIPTION

Displays in electronic devices such as liquid crystal displays may be provided with polarizers. Illustrative electronic devices that have displays with polarizers are shown in FIGS. 1, 2, 3, and 4.

Figure 1:
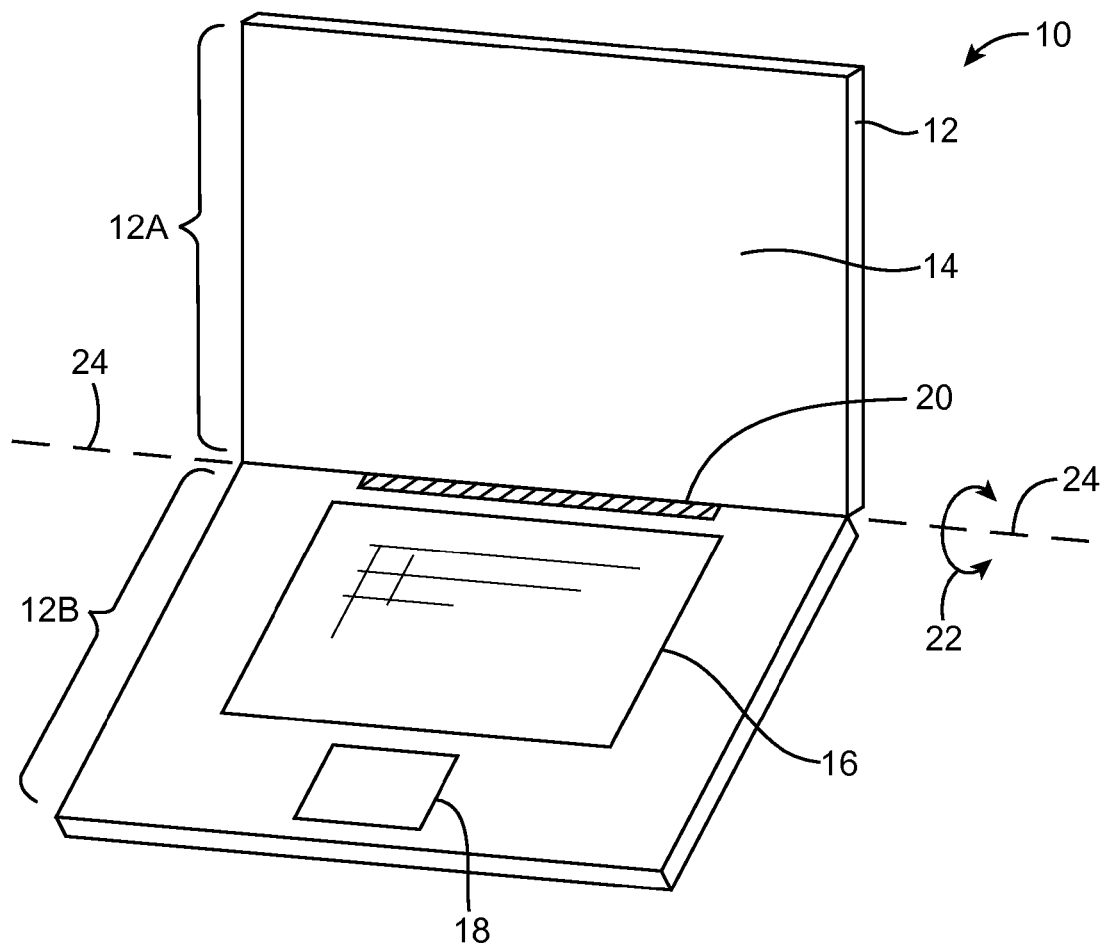
FIG. 1 is a perspective view of an illustrative electronic device such as a laptop computer with display structures in accordance with an embodiment.

Electronic device 10 of FIG. 1 has the shape of a laptop computer and has upper housing 12A and lower housing 12B with components such as keyboard 16 and touchpad 18. Device 10 has hinge structures 20 to allow upper housing 12A to rotate in directions 22 about rotational axis 24 relative to lower housing 12B. Display 14 is mounted in upper housing 12A. Upper housing 12A, which may sometimes referred to as a display housing or lid, is placed in a closed position by rotating upper housing 12A towards lower housing 12B about rotational axis 24.

Figure 2:
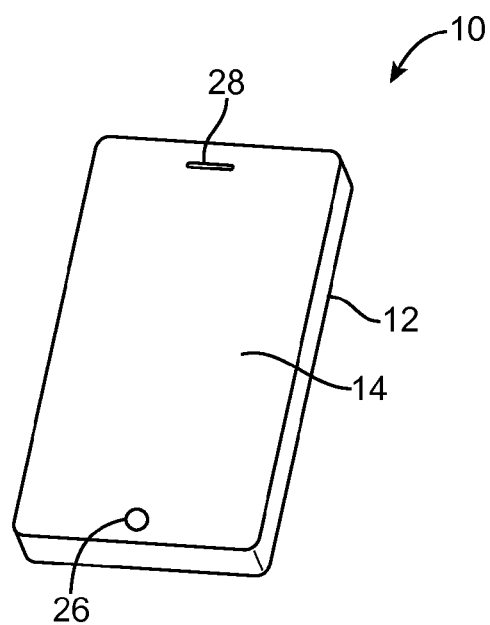
FIG. 2 is a perspective view of an illustrative electronic device such as a handheld electronic device with display structures in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28.

Figure 3:
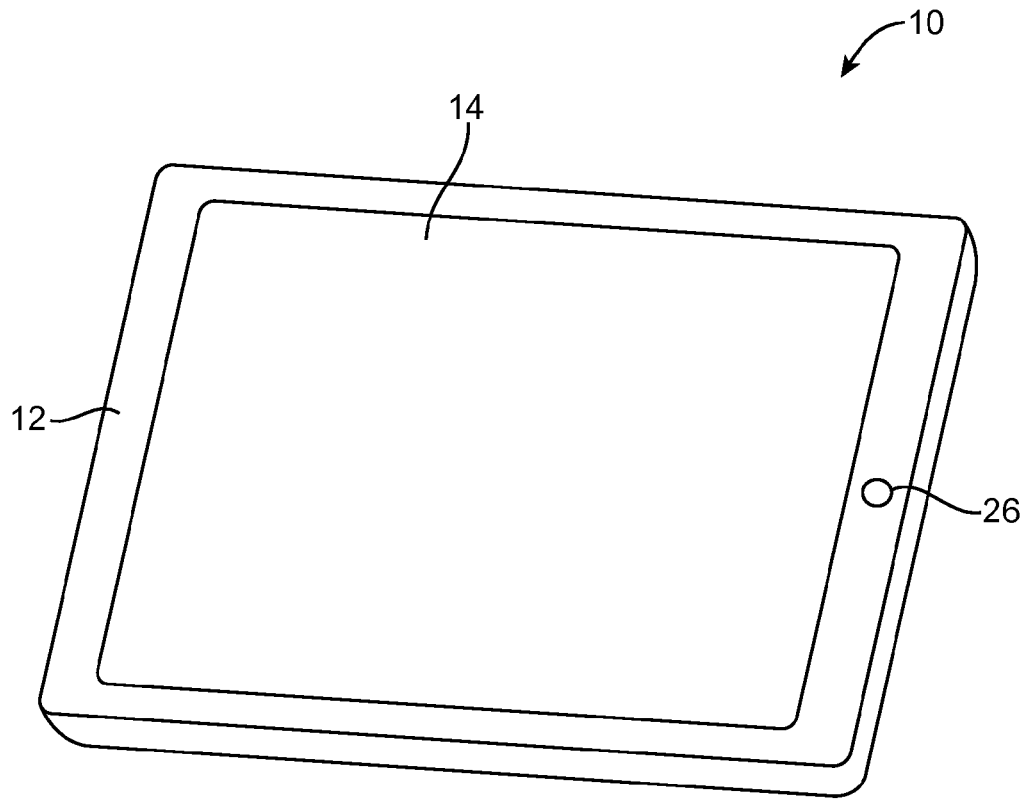
FIG. 3 is a perspective view of an illustrative electronic device such as a tablet computer with display structures in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an external layer with an opening to accommodate button 26.

Figure 4:
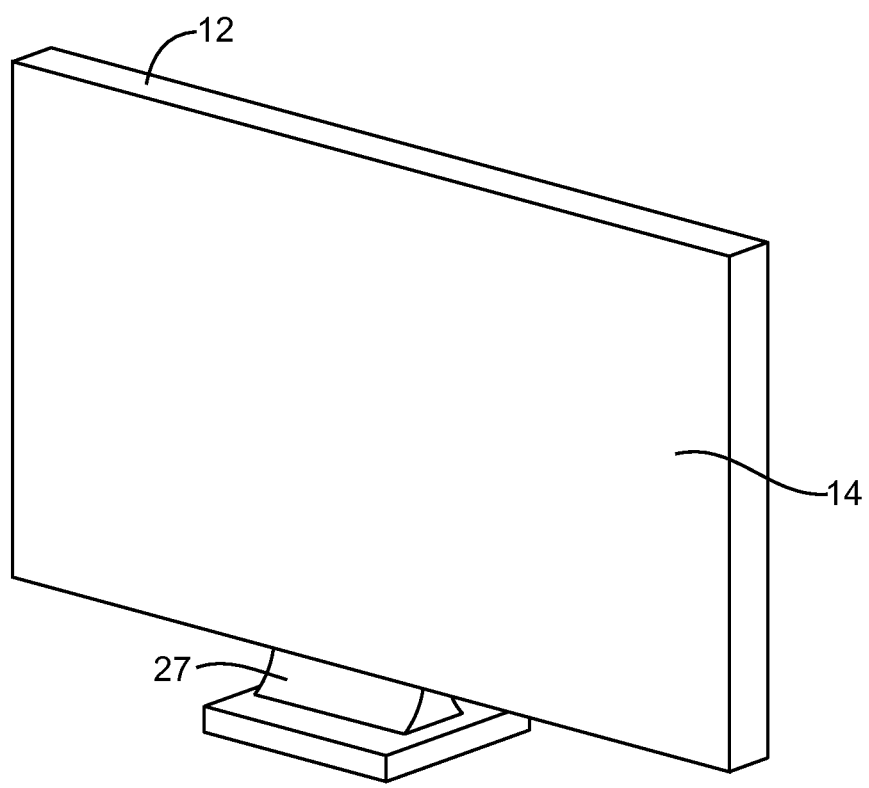
FIG. 4 is a perspective view of an illustrative electronic device such as a computer display with display structures in accordance with an embodiment.

FIG. 4 shows an illustrative configuration for electronic device 10 in which device 10 is a computer display or a computer that has been integrated into a computer display. With this type of arrangement, housing 12 for device 10 is mounted on a support structure such as stand 27. Display 14 is mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, is formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
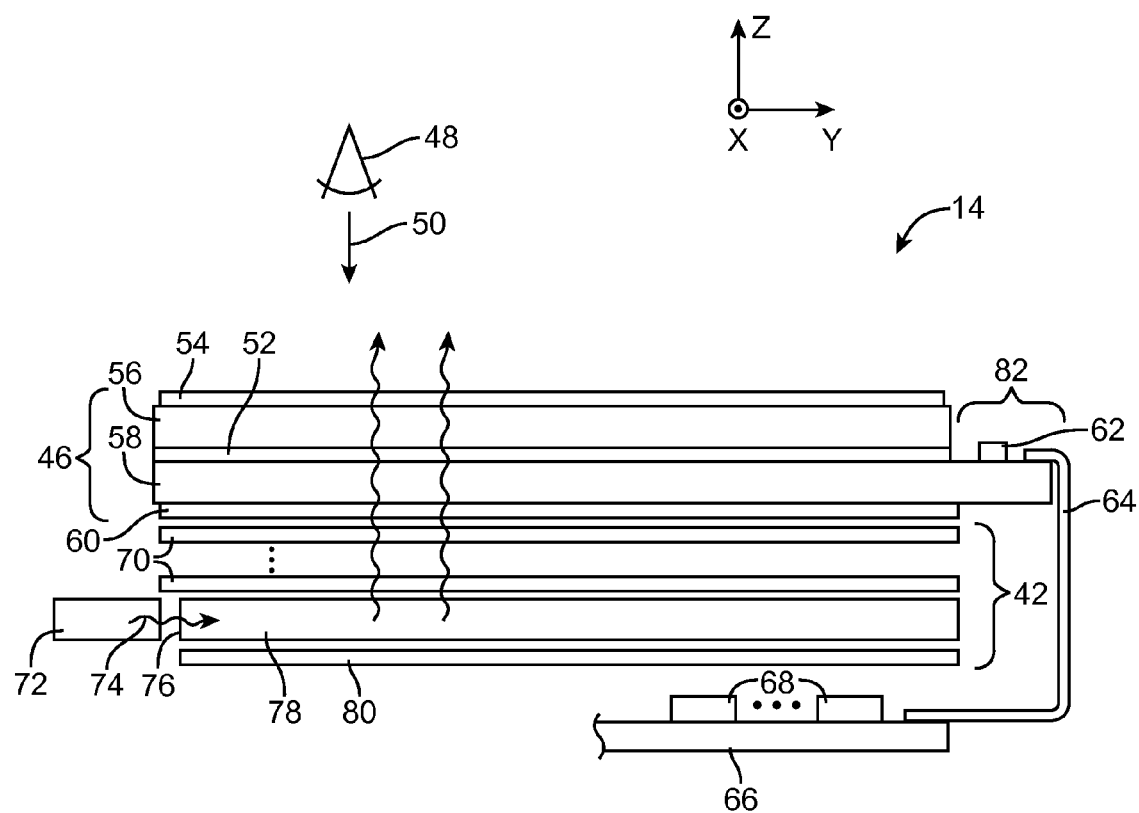
FIG. 5 a cross-sectional side view of an illustrative display of the type that may be used in devices of the types shown in FIGS. 1, 2, 3, and 4 in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 includes backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 illuminates images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 form a liquid crystal display or may be used in forming displays of other types.

In a configuration in which display layers 46 are used in forming a liquid crystal display, display layers 46 include a liquid crystal layer such a liquid crystal layer 52. Liquid crystal layer 52 is sandwiched between display layers such as display layers 58 and 56. Layers 56 and 58 are interposed between lower polarizer layer 60 and upper polarizer layer 54.

Layers 58 and 56 are formed from transparent substrate layers such as clear layers of glass or plastic. Layers 56 and 58 are layers such as a thin-film transistor layer (e.g., a thin-film-transistor substrate such as a glass layer coated with a layer of thin-film transistor circuitry) and/or a color filter layer (e.g., a color filter layer substrate such as a layer of glass having a layer of color filter elements such as red, blue, and green color filter elements arranged in an array). Conductive traces, color filter elements, transistors, and other circuits and structures are formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 is a thin-film transistor layer that includes an array of thin-film transistors and associated electrodes (display pixel electrodes) for applying electric fields to liquid crystal layer 52 and thereby displaying images on display 14. Layer 56 is a color filter layer that includes an array of color filter elements for providing display 14 with the ability to display color images. If desired, layer 58 may be a color filter layer and layer 56 may be a thin-film transistor layer.

During operation of display 14 in device 10, control circuitry (e.g., one or more integrated circuits such as components 68 on printed circuit 66 of FIG. 5 and/or other circuitry) is used to generate information to be displayed on display 14 (e.g., display data). The information to be displayed is conveyed from circuitry 68 to display driver integrated circuit 62 using a signal path such as a signal path formed from conductive metal traces in flexible printed circuit 64 (as an example).

Display driver circuitry such as display driver integrated circuit 62 of FIG. 5 is mounted on thin-film-transistor layer driver ledge 82 or elsewhere in device 10. A flexible printed circuit cable such as flexible printed circuit 64 is used in routing signals between printed circuit 66 and thin-film-transistor layer 58. If desired, display driver integrated circuit 62 may be mounted on printed circuit 66 or flexible printed circuit 64. Printed circuit 66 is formed from a rigid printed circuit board (e.g., a layer of fiberglass-filled epoxy) or a flexible printed circuit (e.g., a flexible sheet of polyimide or other flexible polymer layer).

Backlight structures 42 include a light guide plate such as light guide plate 78. Light guide plate 78 is formed from a transparent material such as clear glass or plastic. During operation of backlight structures 42, a light source such as light source 72 generates light 74. Light source 72 may be, for example, an array of light-emitting diodes.

Light 74 from one or more light sources such as light source 72 is coupled into one or more corresponding edge surfaces such as edge surface 76 of light guide plate 78 and is distributed in dimensions X and Y throughout light guide plate 78 due to the principal of total internal reflection. Light guide plate 78 includes light-scattering features such as pits or bumps. The light-scattering features are located on an upper surface and/or on an opposing lower surface of light guide plate 78.

Light 74 that scatters upwards in direction Z from light guide plate 78 serves as backlight 44 for display 14. Light 74 that scatters downwards is reflected back in the upwards direction by reflector 80. Reflector 80 is formed from a reflective material such as a layer of white plastic or other shiny materials.

To enhance backlight performance for backlight structures 42, backlight structures 42 include optical films 70. Optical films 70 include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 overlap the other structures in backlight unit 42 such as light guide plate 78 and reflector 80. For example, if light guide plate 78 has a rectangular footprint in the X-Y plane of FIG. 5, optical films 70 and reflector 80 preferably have a matching rectangular footprint.

The outermost layer of display 14 may be a protective display layer such as a layer of glass that covers layers 46 or a display layer such as color filter layer 56 (e.g., a glass substrate layer in layer 56) may serve as the outermost structural layer in display 14. When display layer 56 is used as the outermost substrate layer in display 14, visible border structures in display 14 can be minimized by accurately trimming polarizer 54 along the edge of layer 56. Polarizing trimming operations can be performed using lasers, cutting blades (knife edges), or other trimming equipment. Care should be taken during trimming operations not to damage display layer 56. As an example, care should be taken not to induce thermal damage to a glass substrate in layer 56 during laser trimming operations or mechanical damage to a glass substrate in layer 56 during cutting blade trimming operations.

Figure 6:
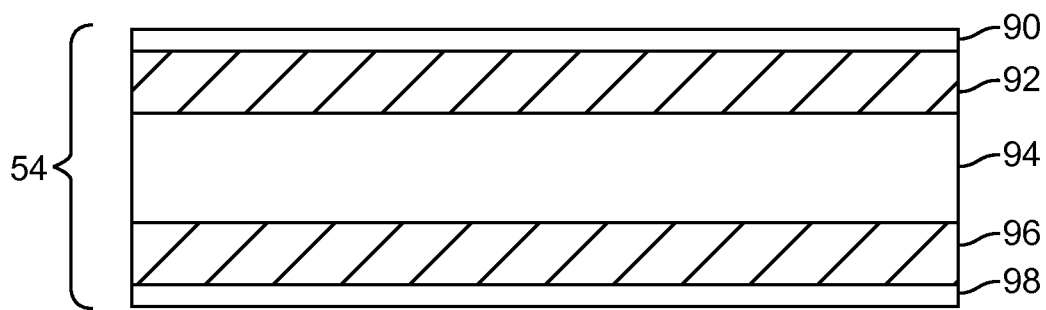
FIG. 6 is a cross-sectional side view of an illustrative polarizer layer in accordance with an embodiment.

A cross-sectional side view of an illustrative polarizer layer in display 14 is shown in FIG. 6. Polarizer layer 54 of FIG. 6 is an upper polarizer such as upper polarizer 54 of FIG. 5. Lower polarizer layers such as lower polarizer 60 may be constructed similarly.

In the example of FIG. 6, polarizer 54 is formed from multiple layers of material that are attached together. Polarizer film 94 is formed from a stretched polymer such as stretched polyvinyl alcohol (PVA) and may therefore sometimes be referred to as a PVA layer. Iodine may be placed on the stretched PVA film so that iodine molecules align with the stretched film and form the polarizer. Other types of polarizer films may be used if desired.

Polarizer film 94 is sandwiched between layers 92 and 96. Layers 92 and 96 may be formed from a material such as tri-acetyl cellulose (TAC) and may sometimes be referred to as TAC films or may be formed from other polymers. The TAC films may help hold the PVA film in its stretched configuration and may protect the PVA film. Other films may be attached to polarizer film 94 if desired.

Coating layer 90 includes one or more films of material that provide polarizer 54 with desired surface properties. For example, layer 90 may be formed from materials that provide polarizer 54 with antiglare (light diffusing) properties, antireflection properties, scratch resistance, fingerprint resistance, and other desired properties. Layer 90 preferably is formed from one or more layers of material such as antireflection (AR) layers (e.g., films formed from a stack of alternating high-index-of-refraction and low-index-of-refraction layers), antiglare layers, antireflection-antiglare layers, oleophobic layers, antiscratch coatings, and other coating layers. The functions of these layers need not be mutually exclusive. For example, an antiglare film in coating 90 may help provide polarizer 54 with scratch resistance.

Polarizer 54 can be provided with a layer of adhesive such as adhesive layer 98 to help attach polarizer 54 to the upper surface of display layers 46 (i.e., color filter 56 of FIG. 5). The thickness of polarizer 54 may be about 50-200 microns or 90-180 microns (as examples). During manufacturing operations, adhesive 98 attaches polarizer 54 to the upper surface of color filter layer 56.

Trimming operations are preferably used to trim the edge of polarizer 54 to match the edge of a coating on color filter layer 56.

Figure 7:
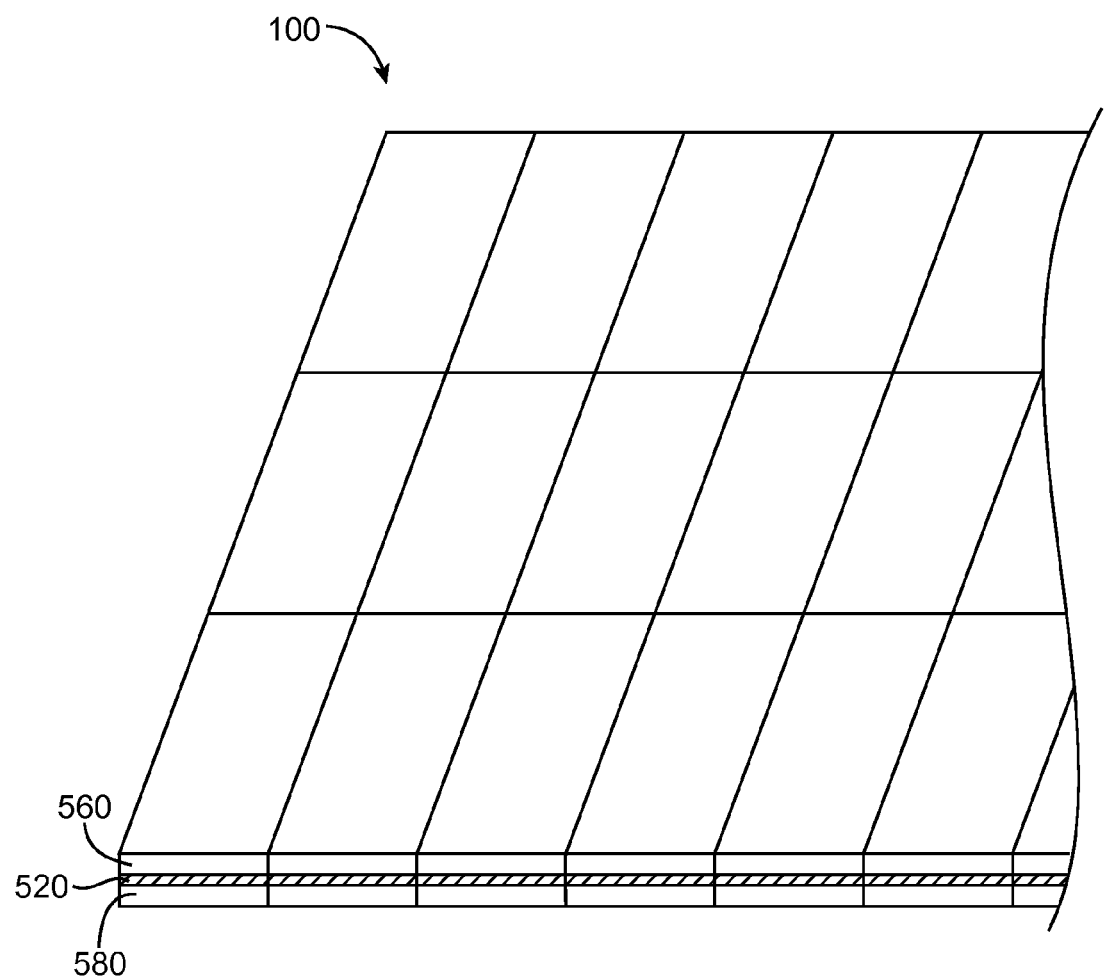
FIG. 7 is a perspective view of an illustrative panel of display layers that includes display structures for forming multiple individual displays in accordance with an embodiment.

Display layers can be formed from larger sheets of material. For example, as shown in FIG. 7, a first oversized glass layer such as layer 560 can include color filter structures for forming multiple color filter layers for multiple displays. A second oversized glass layer such as layer 580 can include thin-film-transistor circuitry for forming multiple thin-film-transistor layers for multiple displays. Liquid crystal material 520 is sandwiched between oversized glass layer 560 and oversized glass layer 580, thus forming oversized display layer 100 (e.g., a panel of display layers). Oversized display layer 100 therefore includes display structures (e.g., color filter structures, thin-film transistor circuitry, liquid crystal material, and other suitable display structures) for forming multiple individual displays. Layer 100 may include one or more layers of glass, ceramic, polymer, or other suitable substrate materials.

Figure 8:
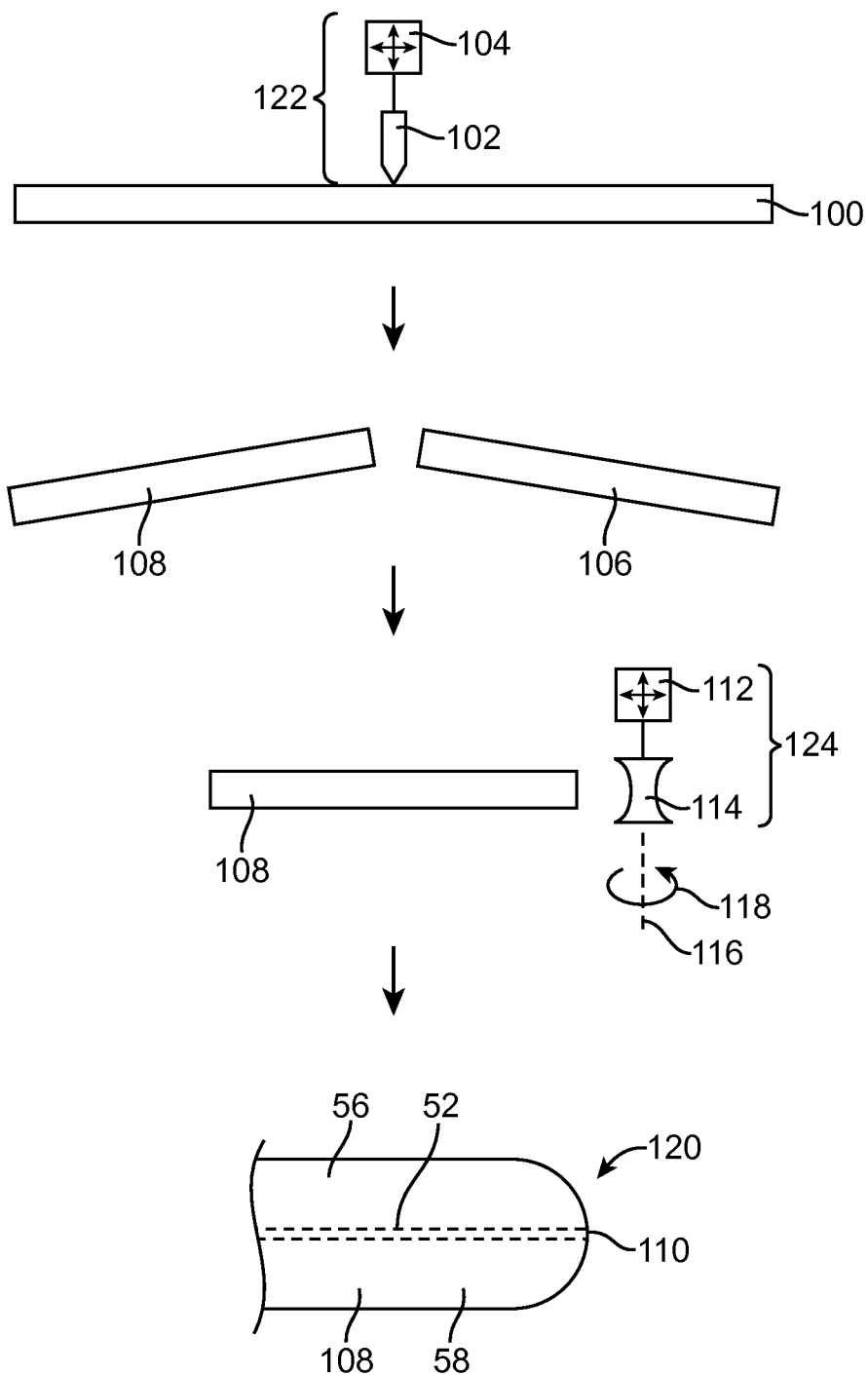
FIG. 8 is a diagram of an illustrative system being used to form individual display layers from a panel of display layers in accordance with an embodiment.

Following formation of oversized display layer 100, layer 100 is divided into smaller pieces. As shown in FIG. 8, equipment such as equipment 122 is used to divide layer 100 into smaller pieces such as substrate 108. Equipment 122 may be substrate cutting equipment such as water-jet cutting equipment, laser cutting equipment, sawing equipment, machining equipment, or other equipment for dividing layer 100 into smaller pieces. In the illustrative configuration of FIG. 8, equipment 122 includes a computer-controlled positioner such as positioner 104 and a scribing tool such as scribing tool 102. Positioner 104 moves scribing tool 102 in a desired pattern over the surface of layer 100 to form scribe lines. Manual and/or automated equipment may then be used to break layer 100 along the scribe lines to form separate pieces of layer 100 such as pieces 106 and 108. Pieces 106 and 108 each have the size and shape of display 14 (e.g., rectangular display-sized pieces of glass).

Following the use of scribing operations or other operations to separate out individual display structures such as display-sized display layer 108 from oversized layer 100 using equipment 122, machining equipment 124 or other edge treatment equipment is used to modify edge surface 100 of the peripheral edge of layer 108. In the illustrative configuration of FIG. 8, equipment 124 includes computer-controlled positioner 112 and machining tool head 114. Head 114 has a surface profile that is configured to ease the sharp corners in layer 108 (e.g., by rounding the upper and lower edges of layer 108, by beveling the upper and lower edges of layer 108, etc.).

During operation, positioner 112 rotates machining tool head 114 about rotational axis 116 in direction 118 while moving head 114 along the edge of layer 108, thereby machining edge surface 110 of layer 108 into a desired shape. As shown at the bottom of FIG. 8, equipment 124 can provide layer 108 with a machined profile for surface 110 such as rounded profile 120 (e.g., edge 110 can be formed from a curved surface).

Machined glass layer 108 is used as a display layer for display 14. In the illustrative example of FIG. 8, glass layer 108 includes multiple display layers such as color filter layer 56 and thin-film-transistor layer 58. Liquid crystal material 52 is interposed between color filter layer 56 and thin-film-transistor layer 58. This is, however, merely illustrative. If desired, layer 108 may be a color filter layer that has not yet been attached to a thin-film-transistor layer or layer 108 may include additional display structures.

Display layer 108 is sometimes referred to herein as glass layer 108. However, it should be understood that layer 108 can include one or more plastic layers, one or more ceramic layers, or one or more layers of other transparent materials. The use of one or more glass layers to form display layer 108 is merely illustrative.

Figure 9:
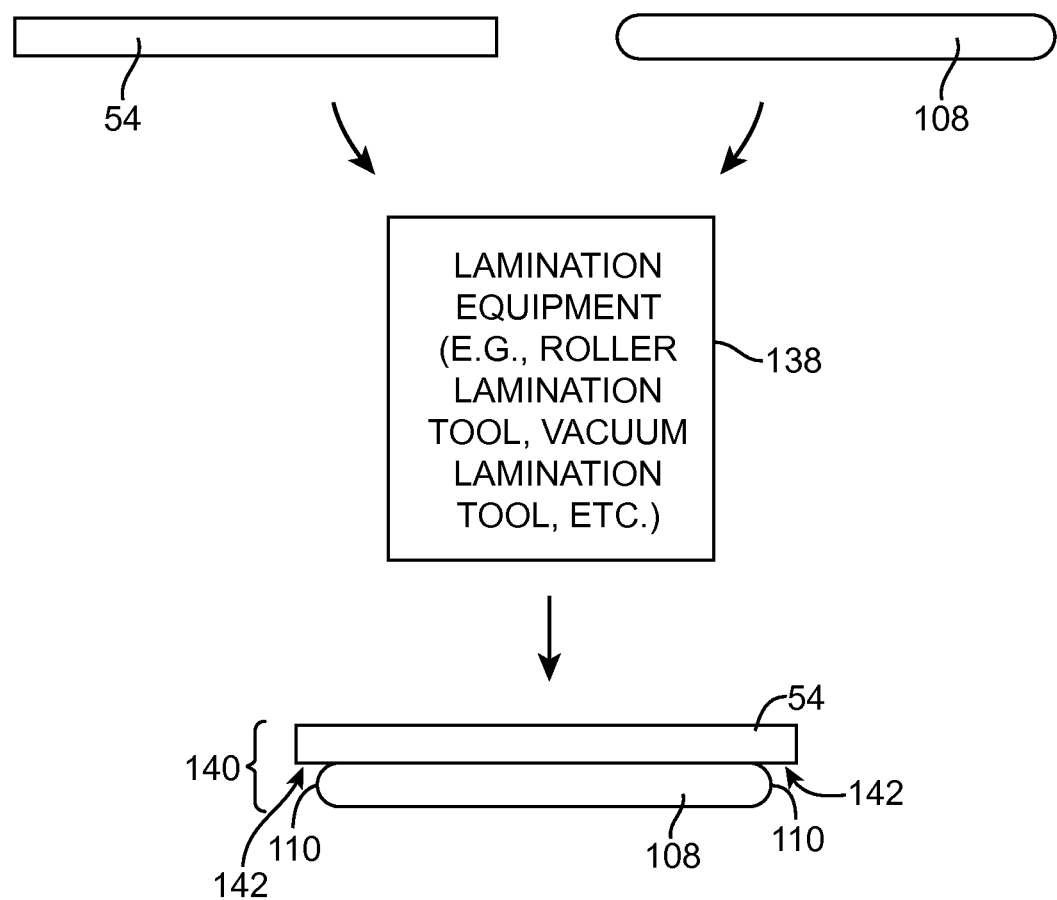
FIG. 9 is a diagram of an illustrative system being used to laminate a polarizer to a display layer in accordance with an embodiment.

FIG. 9 is a system diagram showing how polarizer 54 may be attached to substrate layer 108. In the illustrative configuration of FIG. 9, lamination equipment 138 is being used to laminate polarizer 54 to substrate layer 108. Lamination equipment 138 may include a roller laminator, vacuum lamination equipment, or other equipment for attaching polarizer 54 to substrate 108. When attached using roller-based lamination equipment or other lamination equipment, adhesive layer 98 (FIG. 6) attaches the lower surface of polarizer 54 to the upper surface of display layer 108 to form display structures 140, as shown in the bottom of FIG. 9.

In display structures 140, polarizer 54 has larger lateral dimensions than the corresponding lateral dimensions of layer 108. As a result, portions of polarizer layer 54 extend laterally beyond edge 110 of substrate 108 to form overhanging (overlapping) edge portions 142 of layer 54. Excess portion of polarizer 54 such as overhanging edge portions 142 can be removed following attachment of polarizer layer 54 to glass layer 108. For example, laser-based trimming equipment or other suitable trimming equipment can be used to remove some or all of overhanging edge portions 142 of polarizer layer 54.

To protect glass layer 108 from damage while supporting the edge of polarizer 54 during polarizer trimming operations, it may be desirable to provide glass layer 108 with edge protection. Edge protection structures can also provide a flush edge at the periphery of layer 108 that would otherwise be difficult to achieve due to curved edge surface 110 of layer 108. With one suitable arrangement, peripheral edge 110 of layer 108 is covered with edge protection structures such as a protective coating. The edge protection structures may be formed from resin, epoxy, adhesive, sealant, other polymer-based materials (e.g., silicone or other elastomeric polymer materials, hard plastic materials, etc.), ceramic, metal, or other coatings or structures. As examples, peripheral edge 110 can be covered with light-cured resin, light-cured adhesive, or silicone such as black, clear, or white silicone.

Figure 10:
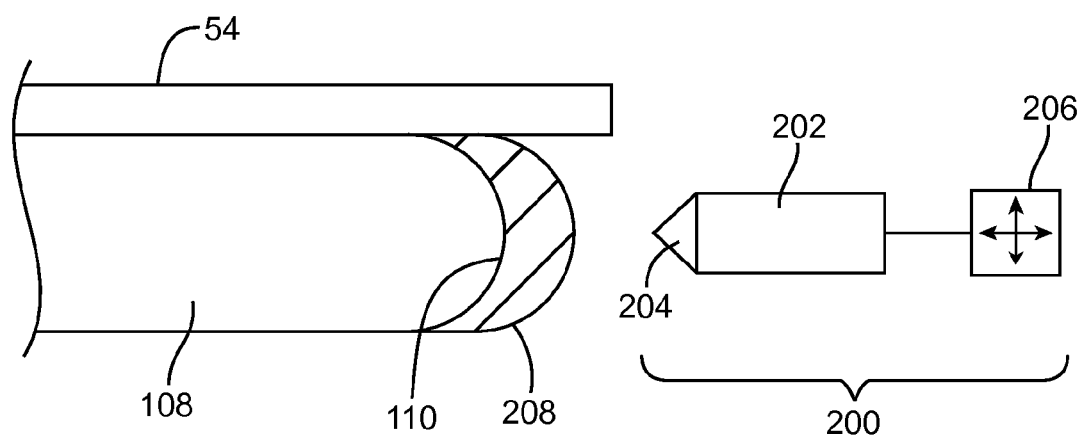
FIG. 10 is a diagram of an illustrative system being used to activate one or more surfaces of a display layer in accordance with an embodiment.

Edge 110 can optionally be treated prior to applying the protective coating in order to promote bonding at edge surfaces 110 with the protective coating. FIG. 10 is a diagram showing how edge 110 of layer 108 can be treated with bonding promotion equipment prior to application of protective coatings. In the example of FIG. 10, equipment such as surface activation equipment 200 is being used to activate edge surface 110 of layer 108. Equipment 200 includes computer-controlled positioner 206, dispensing head 202, and nozzle 204. Equipment 200 may, for example, be a plasma jet configured to discharge a stream of plasma such as plasma 208 onto edge surface 110 of substrate 108. During operation, plasma 208 is discharged from dispensing head 202 via nozzle 204 while positioner 206 runs head 202 around the periphery of layer 108, thereby forcing plasma 208 onto edge surfaces 110 of layer 108. Plasma 208 alters the surface properties of edge surfaces 110 of layer 108 such that surfaces 110 are better suited for coating and/or adhesive bonding (e.g., by removing organic materials from surfaces 110, by altering the surface tension of surfaces 110, by increasing the wettability of surfaces 110, etc.).

If desired, other types of equipment may be used to treat edge surfaces 110 of layer 108 with plasma 208. For example, layer 108 (and polarizer 54, if desired), can be placed in a chamber which is subsequently filled with ionized gas to which edge surfaces 110 of layer 108 are exposed. With this type of arrangement, protective coatings or removable protective structures can be placed over layers or portions of layers that are not to be exposed to the plasma.

Other suitable types of surface activation equipment that can be used to treat edge surfaces 110 of layer 108 prior to coating with protective coatings or structures include corona treatment equipment, flame treatment equipment, chemical treatment equipment, surface abrading equipment, etc. The example of FIG. 10 in which edge surfaces 110 are activated using plasma 208 is merely illustrative. Other edge treatment operations such as cleaning and degreasing operations can be performed on edge surfaces 110 prior to surface activation. If desired, edge surfaces 110 can be coated with protective materials without performing surface activation. The step of using equipment 200 to activate surfaces 110 prior to coating with edge protection structures is optional.

Figure 11:
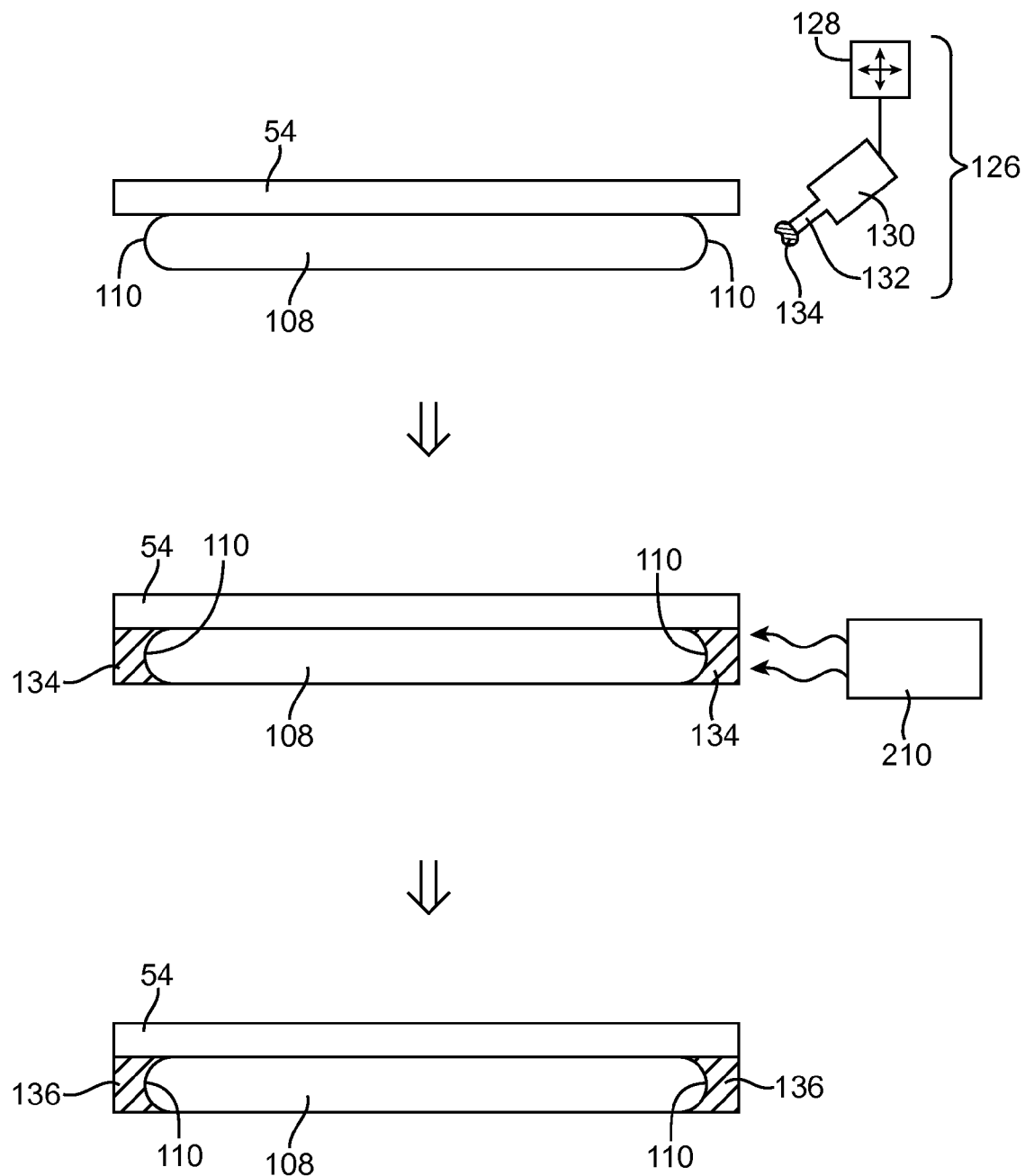
FIG. 11 is a diagram of an illustrative system that is forming an edge coating on a display layer of the type shown in FIG. 8 in accordance with an embodiment.

FIG. 11 is a diagram showing how edge 110 of layer 108 can be covered with a protective coating. In the example of FIG. 11, coating deposition equipment 126 is being used to dispense coating material 132 onto edge 110 of glass layer 108. Equipment 126 includes computer-controlled positioner 128, dispensing head 130, and nozzle 132. During operation, coating material 134 is dispensed onto edge surface 110 via nozzle 132 while positioner 128 runs head 130 around the periphery of glass layer 108, thereby forming edge coating 136. Equipment for dispensing material 134 may include dipping equipment, spraying equipment, ink-jet printing equipment, pad printing equipment, screen printing equipment, painting equipment, physical vapor deposition equipment, electrochemical deposition equipment, etc.

Edge coating 136 may be a resin, sealant, or adhesive such as a light-curable adhesive (e.g., an ultraviolet (UV) light-curable adhesive or a visible light-curable adhesive), a thermal-cure adhesive, an adhesive that is cured via environment-based curing, humidity-based curing, or low-temperature curing (e.g., curing below 50 degrees Fahrenheit), an acrylic-based coating, urethane-based adhesive, or other suitable material. As shown in FIG. 11, equipment 210 is used to cure material 143 and to thereby form edge protection structures 136 on edge surfaces 110 of layer 108. Equipment 210 can include a light source (e.g., a UV light source or visible light source), a heat source (e.g., a hot air gun, a heat lamp, or other heat source), or other suitable curing equipment that can be used to cure material 134 to form coating 136. Coating structures 136 are configured to support at least some of the portion of polarizer 54 that extends laterally beyond edges 110 of substrate layer 108, as shown in FIG. 11.

Edge coating 136 can have any suitable color. In one suitable arrangement, edge coating 136 is an opaque color such as black. Using an black edge coating can help prevent light leakage from display layer 108 to the exterior of device 10. This is, however, merely illustrative. If desired, material 108 may be white, may be optically clear, or may be any other suitable color.

Figure 12:
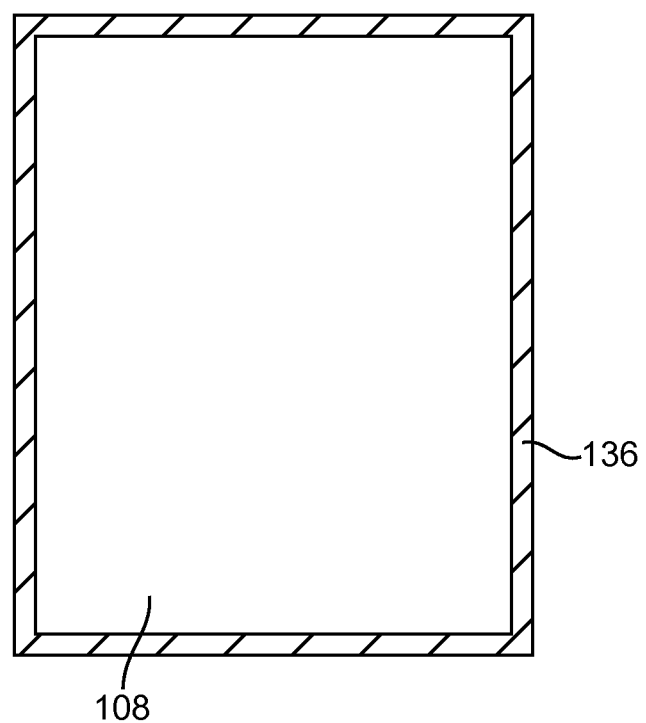
FIG. 12 is a top view of an illustrative display layer with an edge coating in accordance with an embodiment.

FIG. 12 is a top view of layer 108 following coating of peripheral edge 110 with coating structures 136. In the illustrative configuration of FIG. 12, substrate layer 108 has a rectangular footprint so that edge coating 136 has a rectangular ring shape. The rectangular shape of substrate 108 in FIG. 12 allows substrate 108 to be used in forming rectangular displays. Displays of other shapes may be formed if desired.

Figure 13:
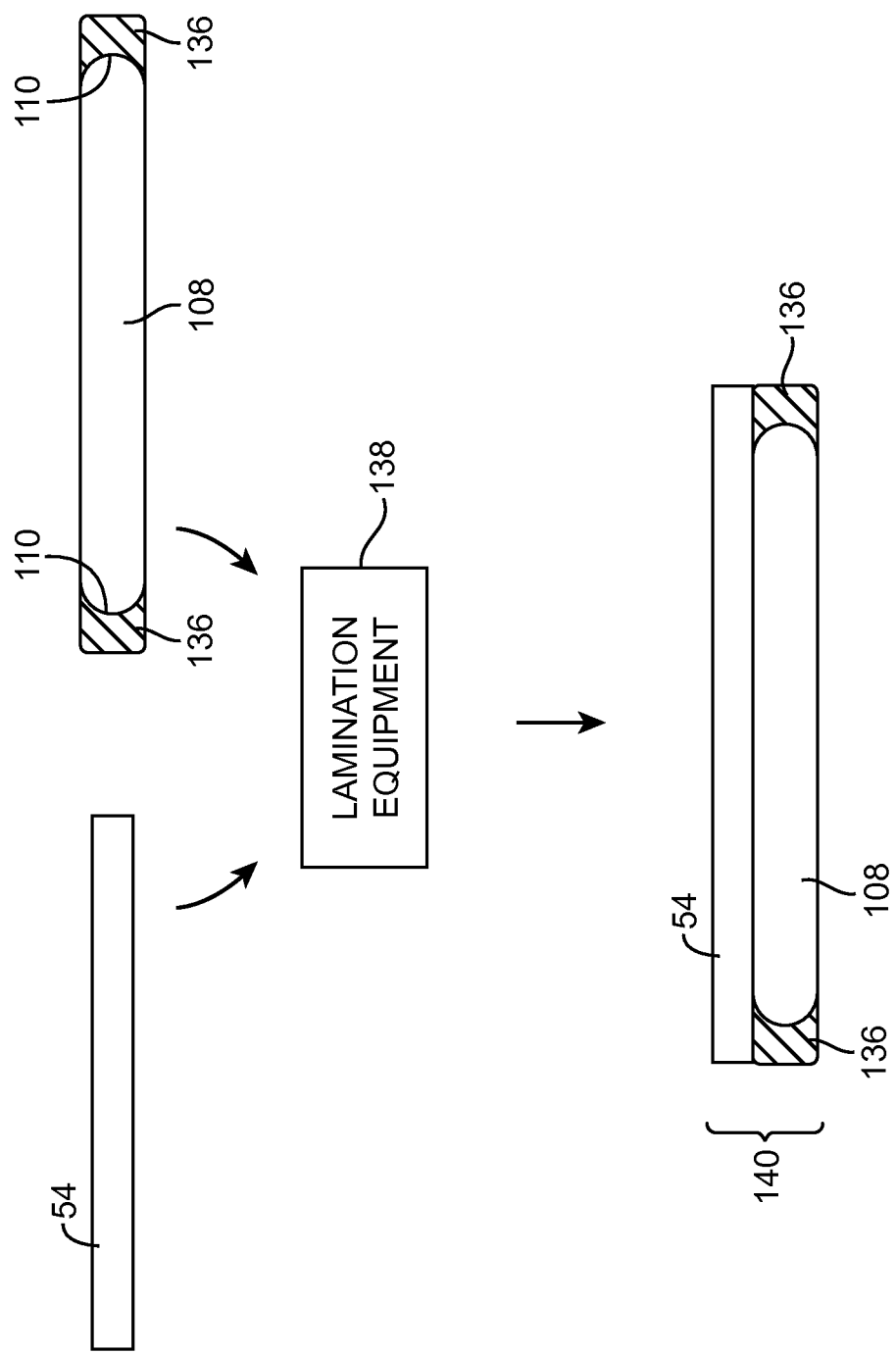
FIG. 13 is a diagram of an illustrative system being used to laminate a polarizer to a display layer with a protective edge coating in accordance with an embodiment.

If desired, polarizer 54 may be attached to glass substrate 108 after equipment 126 is used to apply coating material 132. This type of configuration is shown in FIG. 13. With a configuration of the type shown in FIG. 13, lamination equipment 138 receives polarizer material 54 and glass substrate 108 after coating material 136 has been applied to edge surfaces 110 of layer 108. Lamination equipment 138 laminates layer 54 to layer 108 to form structures 140.

Edge portions of polarizer 54 and coating layer 136 may be trimmed to form a planar edge surface around the periphery of display layer 108. A system such as system 150 of FIG. 14 or other trimming equipment is used to trim the edges of polarizer 54 and coating 136 following attachment of polarizer 54 to substrate layer 108. In a configuration of the type shown in FIG. 14, system 150 includes a camera such as camera 154 for capturing images of layers 54 and 108. Camera 154 includes a digital image sensor that captures digital image data for processing by control unit 152. Camera 154 preferably has sufficient resolution for capturing images of edge 110. Layers 108 and 54 are supported by support structures 164 during digital imaging operations. Light source 165 in support structures 164 generates polarized and/or unpolarized backlight 167 for illuminating layers 108 and 54. The use of polarized light in illuminating layers 108 and 54 can help delineate the location of edge 110 for camera 154.

Data from camera 154 is analyzed by control unit 152 to determine the position of edge 110 relative to laser 160 and laser beam 162. Laser 160 may be an infrared laser such as a carbon dioxide laser operating at a wavelength of 9.6 microns or may be a visible light laser such as a laser operating at a wavelength of approximately 532 nanometers (as examples). Control unit 152 may be one or more computers, embedded processors, networked computing equipment, online computing equipment, and/or other computing equipment for processing digital image data from camera 154 or other sensors to determine the location of edges 110 and for issuing corresponding control signals on outputs 170, 172, and 174.

The control signals on outputs 170, 172, and 174 control the operation of computer-controlled positioners 156, 166, and 158, respectively. For example, control commands on path 170 control the operation of positioner 156, which is used in adjusting the position of camera 154. Control signals on path 172 are used in controlling the operation of positioner 166, which is used in adjusting the position of support 164 (and therefore layers 108 and 54) relative to laser beam 162. Control signals on line 174 are used to control positioner 158 and thereby adjust the position of laser 160 and laser beam 162 relative to edge 110. If desired, different arrangements of positioners may be used. As an example, the position of machine vision equipment such as camera 154 may be fixed and/or positioner 158 and/or positioner 166 may be omitted. Additional positioners (e.g. to control mirrors or other optical structures that direct beam 162 onto layer 54) may also be used. The configuration of FIG. 14 is shown as an example.

Figure 14:
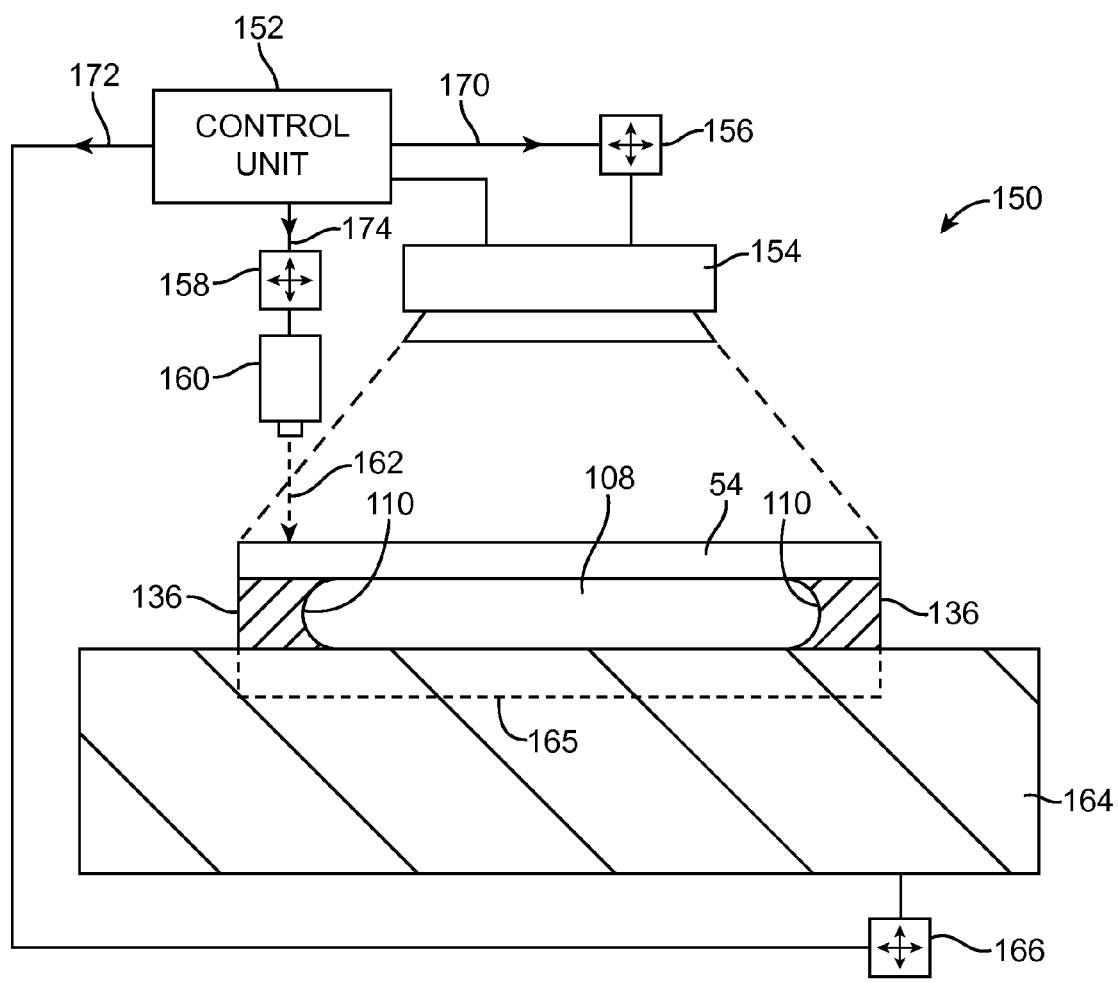
FIG. 14 is diagram of an illustrative system in which laser-based equipment is being used to trim a polarizer and an edge coating on a display layer in accordance with an embodiment.
Figure 15:
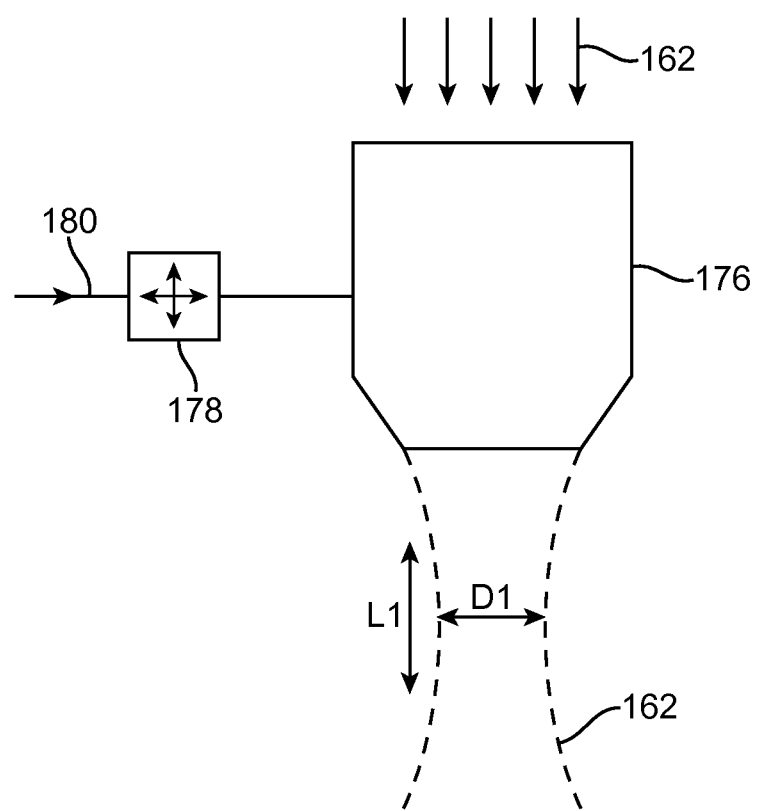
FIG. 15 is side view of an illustrative focusing lens and focused laser beam of the type used in laser trimming a polarizer and an edge coating on a display layer with the equipment of FIG. 14 in accordance with an embodiment.

Optical structures such as lens 176 of FIG. 15 are used to focus laser beam 162. In the configuration of FIG. 15, the position of lens 176 is controlled by positioner 178. Positioner 178 is a computer-controlled positioner that receives control signals from control unit 152 via input 180. In response, positioner 178 positions lens 176 and therefore laser beam 162 relative to layer 54 and edge 110 (FIG. 14). As shown in FIG. 15, lens 176 focuses laser beam 162 to produce a spot of diameter D over a length L. Outside of length L, laser beam 162 becomes unfocused and is characterized by an enlarged spot size and reduced power density. The length of L may be determined by the configuration of lens 176 (e.g., L may be 50 to 2000 microns or less than 100 microns or more than 100 microns). The diameter D may be about 60-100 microns (as an example).

Figure 16:
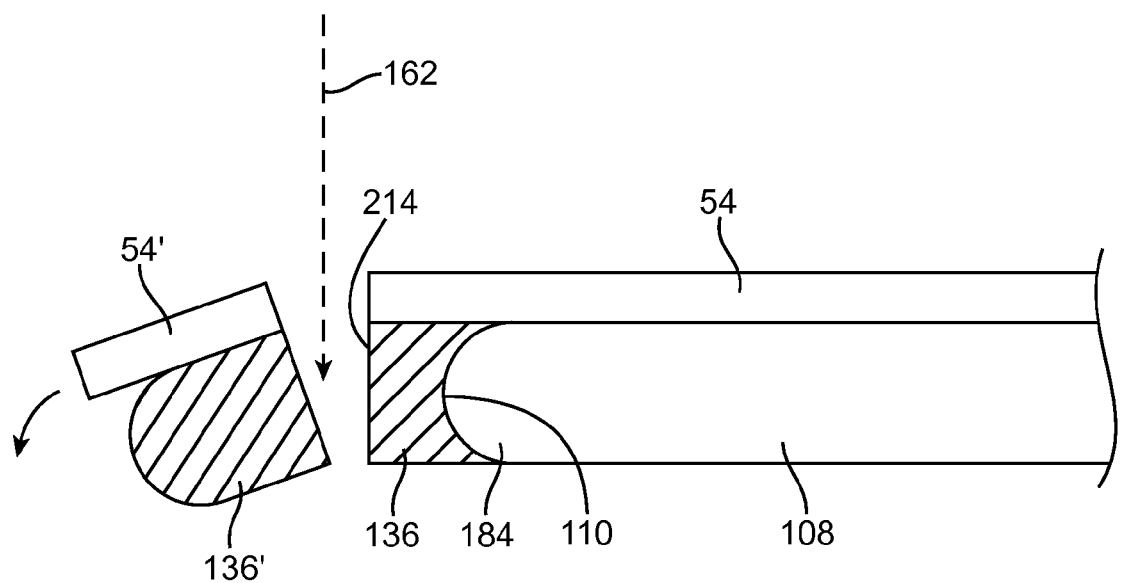
FIG. 16 is a cross-sectional side view of illustrative edge portions of a polarizer and an edge coating being trimmed from display structures to form a flush edge in accordance with an embodiment.

Using polarizer trimming system 150 of FIG. 14, focused laser beam 162 of FIG. 15 is applied to polarizer 54 and edge protection structure 136 to trim away excess portions of polarizer 54 and edge protection structures 136. As shown in FIG. 16, edge portion 54' of polarizer 54 and edge portion 136' of edge protection structure 136 are removed from display layer 108 to expose a planar edge surface such as surface 214. This ensures that that the lateral dimensions of polarizer 54 in dimensions X and Y match the respective lateral dimensions of edge structures 136.

Laser beam 162 is preferably focused on the portion of polarizer 54 that lies just outside of edge 110 of glass layer 108. As shown in FIG. 16, this type of configuration ensures that laser beam 162 cuts through polarizer layer 54 and edge coating 136, rather than being focused on portions 184 of glass layer 108 inside of peripheral edge 110 and on the surface of peripheral edge 110. Glass layer 108 can be damaged by excessive exposure to laser light resulting heating of layer 108, so using system 150 of FIG. 14 to ensure that laser beam 162 is focused on portions of polarizer 54 that overlap coating layer 136 rather than layer 108 avoids degrading the strength and reliability of layer 108 from exposure to laser beam 162.

Following removal of excess edge portions of polarizer 54 and edge coating 136, any portion of polarizer 54 that still overhangs edge 110 of layer 108 is supported by edge coating 136. Edge coating 136 not only provides protection to edges 110 of layer 108 but also provides support and protection to polarizer 54. For example, edge protection structures 136 can minimize the risk of polarizer peeling.

Figure 17:
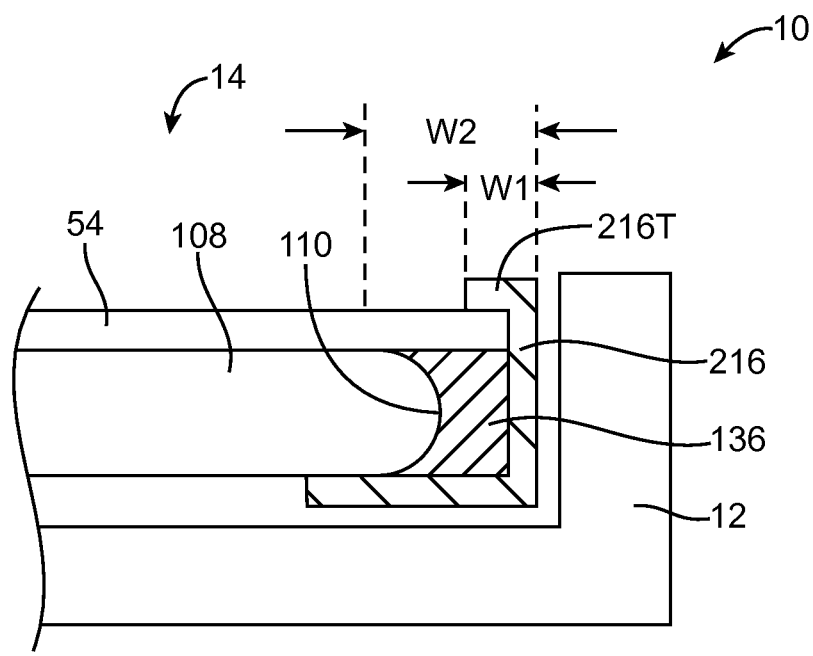
FIG. 17 is a cross-sectional side view of a portion of an illustrative electronic device in which display structures are partially enclosed in a C-shaped trim structure and mounted in an electronic device housing in accordance with an embodiment.

Additionally, the presence of planar edge surface 214 can minimize the border around a display that is used for trim structures, frame structures, or bezels. As shown in FIG. 17, a trim or frame structure such as C-shaped trim structure 216 can wrap around edge 214 (e.g., to form a clamp-like structure that wraps around edge 214 from the upper surface of polarizer layer 54 to the lower surface of layer 108). Trim structure 216 is interposed between the display structures of display 14 and housing 12 of device 10. If edge coating 136 were not present, trim structure 216 would need to cover width W2 of the edge of the upper surface of polarizer 54 in order to sufficiently hide edge 110 of layer 108 from view. With the presence of edge coating 136, however, edge 110 is sufficiently hidden from view and the width of upper portion 216T of trim 216 can be reduced to width W1.

Figure 18:
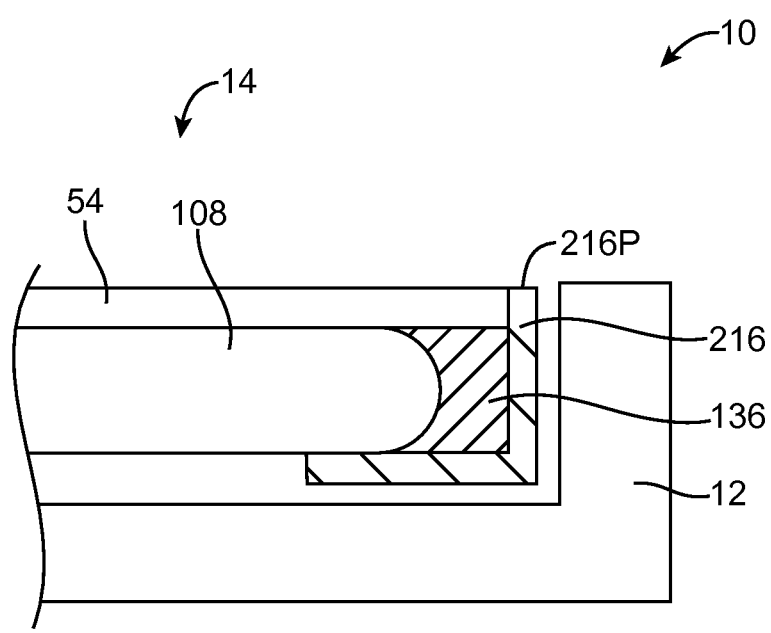
FIG. 18 is a cross-sectional side view of a portion of an illustrative electronic device in which display structures are partially enclosed in an L-shaped trim structure and mounted in an electronic device housing in accordance with an embodiment.

In another suitable arrangement, trim structure 216 can have an L-shaped structure that does not have an upper portion that hooks over the upper surface of polarizer 54. This type of configuration is shown in FIG. 18. As shown in FIG. 18, upper surface 216P of trim structure 216 is flush with the upper surface of polarizer layer 54. If desired, upper surface 216P of trim structure 216 can be fall below the upper surface of polarizer 54. The arrangement of FIG. 18 is merely illustrative. This type of arrangement minimizes the border area around a display that is used for trim or frame structures.

Figure 19:
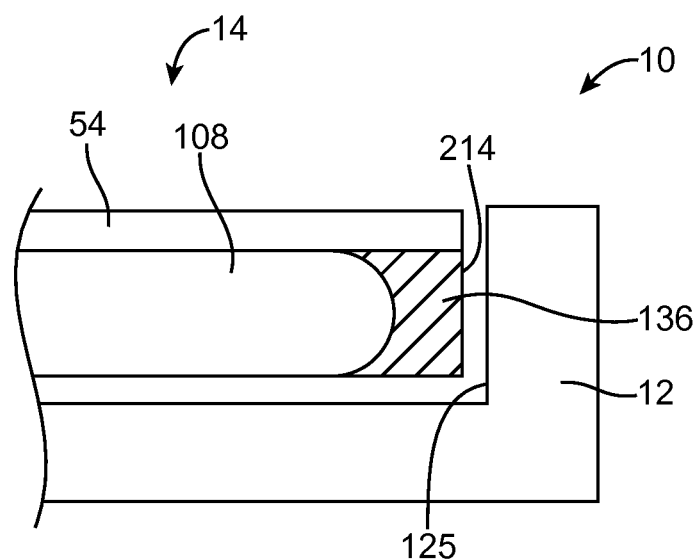
FIG. 19 is a cross-sectional side view of a portion of an illustrative electronic device in which display structures are mounted in an electronic device housing in accordance with an embodiment.

In another suitable arrangement, trim structure 216 can be omitted. This type of arrangement is shown in FIG. 19. As shown in FIG. 19, edge surface 214 formed by the edges of polarizer 54 and coating 136 abuts inner surface 12S of housing 12 of device 10. This type of arrangement not only minimizes the border area around a display used for trim or frame structures but also allows the components of device 10 such as display 14 to be mounted in device housing 12 more compactly.

Figure 20:
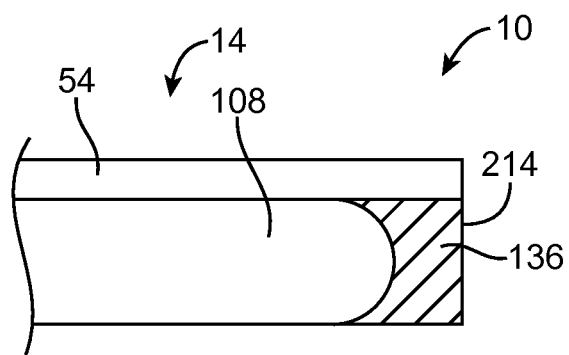
FIG. 20 is a cross-sectional side view of illustrative display structures in which the edge surface of a polarizer and the edge surface of a protective coating on a display layer together form an outermost edge surface of an electronic device in accordance with an embodiment.

If desired, edge surface 214 formed from the edges of polarizer 54 and coating structure 136 can form the outermost peripheral edge of device 10. This type of configuration is shown in FIG. 20. As shown in FIG. 20, flush edge 214 forms an outermost peripheral edge surface of device 10. If desired, additional layers, coatings, and/or components can be mounted to polarizer 54 (e.g., a cover layer such as a cover glass) and/or to layer 108. Edge protection structures 136 provide sufficient protection for both display layer 108 as well as polarizer 54 such that an additional housing sidewall may not be required.

Figure 21:
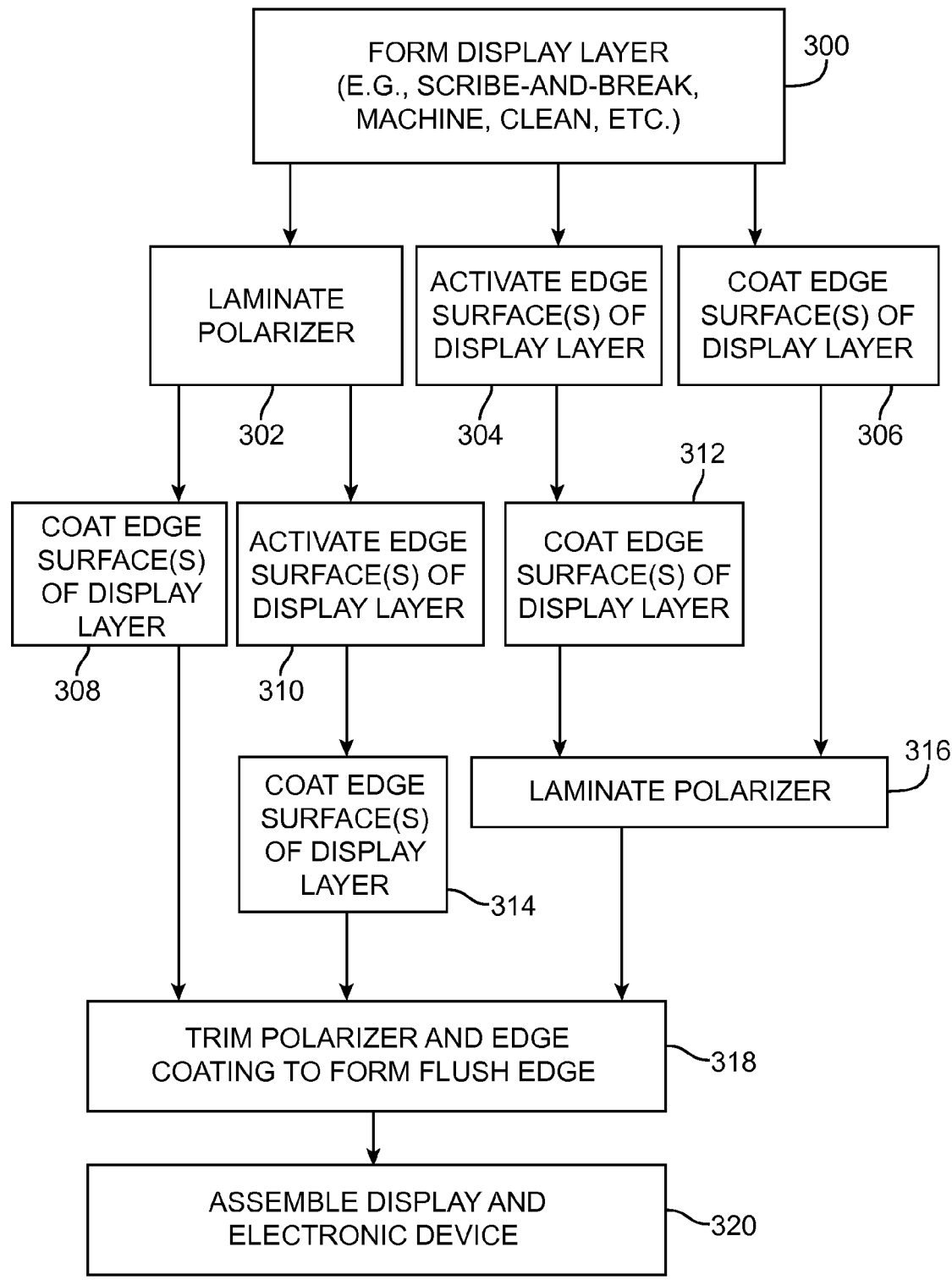
FIG. 21 is a flow chart of illustrative steps involved in forming electronic devices and displays by trimming polarizers on displays in accordance with an embodiment.

FIG. 21 is a flow chart of illustrative steps involved in forming display 14 and electronic device 10. As shown in FIG. 21, display layers such as display layer 108 (e.g., a display layer that includes a layer of liquid crystal material sandwiched between color filter layer 56 and thin-film-transistor layer 58) may be formed at step 300. The formation of display layer 108 may involve scribing and breaking glass layers such as layer 100 to form glass layers such as glass layer 108. Edge surfaces 110 of glass layer 108 may be machined using equipment 124.

Following formation of glass layer 108 at step 300, polarizer layer 54 is attached to the upper surface of glass layer 108 using lamination equipment 138 at step 302. Edge surfaces 110 are then treated with plasma at step 310 using equipment 200. Following surface activation of edge surfaces 110 of layer 108, edge surfaces 110 are coated with coating 136 at step 314.

If desired, edge surfaces 110 of layer 108 can be activated with plasma 208 and subsequently coated with coating 136 prior to laminating polarizer 54 to layer 108, as shown by steps 304, 312, and 316. Prior to laminating polarizer 54 to layer 108, edge surfaces 110 may be coated with coating 136 without plasma surface activation, as shown by steps 306 and 316.

At step 318, laser-based or cutting-blade-based trimming techniques are used to trim the peripheral edges of polarizer 54 and coating 136 from the edges of glass layer 108. By trimming excess polarizer and coating away, the lateral dimensions of polarizer 54 are trimmed to match the lateral dimensions of coating 136, thereby forming flush edge 214.

Substrate 108 may form a liquid crystal display cell that includes liquid crystal 52 interposed between color filter layer 56 and thin-film-transistor layer 58 of display 14 of FIG. 5. At step 320, the layers of display 14 may be assembled to form display 14 of FIG. 5 and display 14 may optionally be installed in device housing 12 of electronic device 10 with other device components.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
  a display layer having a peripheral edge surface, wherein the display layer includes a color filter substrate and a thin-film transistor substrate and wherein the peripheral edge surface comprises a portion of the color filter substrate and a portion of the thin-film transistor substrate;
  a polarizer having a peripheral edge surface and having an inner surface attached to and in physical contact with the display layer; and
  a coating having opposing inner and outer surfaces, wherein the inner surface is on the peripheral edge surface of the display layer, and wherein the polarizer extends beyond the peripheral edge surface of the display layer such that the outer surface of the coating is coplanar with the peripheral edge surface of the polarizer.

2. The electronic device defined in claim 1 wherein the coating comprises light-cured adhesive.

3. The electronic device defined in claim 1 wherein the coating comprises polymer.

4. The electronic device defined in claim 1 wherein the coating comprises silicone.

5. The electronic device defined in claim 1 wherein the peripheral edge surface of the display layer is curved.

6. The electronic device defined in claim 1 wherein the coating and the peripheral edge surface of the polarizer form an outermost edge surface of the electronic device.

7. The electronic device defined in claim 1 wherein the display layer comprises at least one layer of glass.

8. The electronic device defined in claim 1 wherein the display layer comprises:
  liquid crystal material interposed between the color filter substrate and the thin-film-transistor substrate.

9. The electronic device defined in claim 1 further comprising:
  an electronic device housing, wherein the peripheral edge surface of the polarizer and the coating abut an inner surface of the electronic device housing.

10. The electronic device defined in claim 1 wherein the display layer and the coating each have an upper surface, wherein the polarizer is in physical contact with the upper surface of the display layer, and wherein the upper surface of the coating is coplanar with the upper surface of the display layer.

11. The electronic device defined in claim 1 wherein the coating and the polarizer share a laser-cut edge.

12. A method, comprising:
    attaching an inner surface of a polarizer layer to a display layer such that the inner surface of the polarizer layer is in physical contact with the display layer;
    coating a peripheral edge surface of the display layer with a coating layer, wherein the display layer comprises a color filter substrate and a thin-film transistor substrate and wherein the peripheral edge surface comprises a portion of the color filter substrate and a portion of the thin-film transistor substrate; and
    while the peripheral edge surface of the display layer is coated with the coating layer, trimming the polarizer layer and the coating to form a planar edge surface, wherein the coating layer has opposing inner and outer surfaces, wherein the inner surface is on the peripheral edge surface, wherein the planar edge surface is formed from a peripheral edge surface of the polarizer layer and the outer surface of the coating layer, and wherein the polarizer layer extends beyond the peripheral edge surface of the display layer.

13. The method defined in claim 12 wherein forming the display layer comprises machining a display layer that includes the color filter substrate attached to the thin-film-transistor substrate.

14. The method defined in claim 12 further comprising:
    with surface activation equipment, activating the peripheral edge surface of the display layer prior to coating the peripheral edge surface of the display layer with the coating layer.

15. The method defined in claim 14 wherein the surface activation equipment comprises plasma surface activation equipment.

16. The method defined in claim 14 wherein activating the peripheral edge surface of the display layer comprises:
    with a computer-controlled positioner, moving a plasma jet around the peripheral edge surface of the display layer; and
    with the plasma jet, discharging plasma onto the peripheral edge surface of the display layer as the plasma jet is moved by the computer-controlled positioner.

17. The method defined in claim 12 wherein the coating layer comprises a light-curable coating layer, the method further comprising:
    with a light source, curing the light-curable coating layer.

18. The method defined in claim 12 wherein the coating layer comprises a thermal-cure coating layer, the method further comprising:
    with a heat source, curing the thermal-cure coating layer.

19. A method, comprising:
    laminating an oversized polarizer onto a glass substrate having a peripheral edge so that an overhanging portion of the polarizer overhangs the peripheral edge and so that the oversized polarizer is in physical contact with the glass substrate, wherein the glass substrate comprises a color filter substrate and a thin-film transistor substrate and wherein the peripheral edge of the glass substrate comprises a portion of the color filter substrate and a portion of the thin-film transistor substrate;
    with coating deposition equipment, dispensing a coating onto the peripheral edge, wherein the coating has an inner surface on the peripheral edge; and
    with a laser, cutting through the overhanging portion of the polarizer and the coating such that an outer surface of the coating is coplanar with a peripheral edge surface of the polarizer, wherein the polarizer extends beyond the peripheral edge of the glass substrate after cutting through the overhanging portion of the polarizer.

20. The method defined in claim 19 wherein the laser comprises an infrared laser.

21. The method defined in claim 19 wherein the laser comprises a visible light laser.

22. The method defined in claim 19 wherein the cutting comprises using a camera to determine relative positions between the peripheral edge of the glass substrate and a laser beam.

23. The method defined in claim 19 wherein cutting through the overhanging portion of the polarizer and the coating comprises exposing a planar edge surface, wherein the planar edge surface includes the peripheral edge surface of the polarizer and the outer surface of the coating.

* * * * *